(12) United States Patent
Ge et al.

(10) Patent No.: US 10,618,423 B2
(45) Date of Patent: Apr. 14, 2020

(54) ISOLATED DUAL BUS HYBRID VEHICLE DRIVETRAIN

(71) Applicant: Ford Global Technologies, LLC, Dearborn, MI (US)

(72) Inventors: Baoming Ge, Okemos, MI (US); Lihua Chen, Farmington Hills, MI (US); Yan Zhou, Canton, MI (US); Shuitao Yang, Canton, MI (US); Fan Xu, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 223 days.

(21) Appl. No.: 15/706,267

(22) Filed: Sep. 15, 2017

(65) Prior Publication Data

US 2019/0084444 A1    Mar. 21, 2019

(51) Int. Cl.
*B60L 15/00*   (2006.01)
*B60L 50/15*   (2019.01)
*B60L 58/10*   (2019.01)

(52) U.S. Cl.
CPC ............. *B60L 15/007* (2013.01); *B60L 50/15* (2019.02); *B60L 58/10* (2019.02); *B60L 2210/42* (2013.01); *B60L 2220/50* (2013.01); *Y10S 903/904* (2013.01)

(58) Field of Classification Search
USPC .......................................................... 701/22
See application file for complete search history.

(56) References Cited

U.S. PATENT DOCUMENTS

| 5,625,550 | A | * | 4/1997 | Leggate | H02M 7/53875 318/811 |
| 5,627,447 | A | * | 5/1997 | Unsworth | H02P 23/26 318/400.17 |
| 5,714,821 | A |   | 2/1998 | Dittman | |
| 5,767,637 | A | * | 6/1998 | Lansberry | F02C 6/20 180/65.22 |
| 5,925,993 | A | * | 7/1999 | Lansberry | B60K 6/46 318/139 |
| 7,180,217 | B2 | * | 2/2007 | Nakayama | B62D 5/0403 310/179 |
| 7,646,127 | B2 | * | 1/2010 | Fujii | H02K 3/28 310/179 |
| 7,826,939 | B2 | * | 11/2010 | Liu | B60K 6/48 701/22 |
| 7,859,210 | B2 | * | 12/2010 | Sakurai | H02M 5/00 318/400.26 |
| 8,164,289 | B2 | * | 4/2012 | Okubo | B62D 5/046 318/400.19 |

(Continued)

*Primary Examiner* — Jean Paul Cass
(74) *Attorney, Agent, or Firm* — Brooks Kushman PC; David Kelly

(57) ABSTRACT

A powertrain for a vehicle includes a Y-wound generator, a Y-wound motor, a generator inverter, a motor inverter, and a traction battery. The Y-wound generator and Y-wound motor are coupled via each respective neutral terminal. The generator inverter is coupled between the Y-wound generator and a generator bus and the motor inverter is coupled between the Y-wound motor and a motor bus. The traction battery has a first terminal coupled to each neutral terminal and a second terminal coupled to bus terminals of the generator and motor bus.

4 Claims, 6 Drawing Sheets

(56) References Cited

U.S. PATENT DOCUMENTS

| | | | |
|---|---|---|---|
| 8,868,274 B2* | 10/2014 | Shiiba | B60W 30/19 |
| | | | 701/22 |
| 8,948,943 B2* | 2/2015 | Takagi | B60W 10/08 |
| | | | 180/65.21 |
| 9,312,737 B2* | 4/2016 | Ryu | H02K 3/522 |
| 9,748,886 B1* | 8/2017 | McDonald | H02K 21/024 |
| 10,063,180 B2* | 8/2018 | Wang | H02K 3/28 |
| 10,116,249 B2* | 10/2018 | Zou | B60L 50/51 |
| 10,189,357 B2* | 1/2019 | Zou | H02J 3/16 |
| 2002/0118496 A1* | 8/2002 | Petruska | H02P 7/04 |
| | | | 361/23 |
| 2004/0155526 A1* | 8/2004 | Naden | H02J 3/28 |
| | | | 307/43 |
| 2006/0201730 A1 | 9/2006 | Kaneko et al. | |
| 2009/0271057 A1* | 10/2009 | Stone | B60K 6/24 |
| | | | 701/22 |
| 2010/0013346 A1* | 1/2010 | Peek | H02K 16/04 |
| | | | 310/216.007 |
| 2010/0063675 A1 | 3/2010 | Soma et al. | |
| 2010/0213778 A1* | 8/2010 | Knutson | H02K 21/024 |
| | | | 310/154.02 |
| 2010/0250043 A1* | 9/2010 | Scheucher | B60L 53/305 |
| | | | 701/22 |
| 2010/0292877 A1* | 11/2010 | Lee | B60K 1/04 |
| | | | 701/21 |
| 2011/0227523 A1* | 9/2011 | Grantz | H02P 25/188 |
| | | | 318/724 |
| 2012/0316717 A1* | 12/2012 | Daum | B60L 11/1861 |
| | | | 701/22 |
| 2013/0066501 A1* | 3/2013 | Oyama | B60L 3/003 |
| | | | 701/22 |
| 2013/0166131 A1* | 6/2013 | Shiiba | B60K 6/365 |
| | | | 701/22 |
| 2013/0317681 A1* | 11/2013 | Bissontz | B60T 1/10 |
| | | | 701/22 |
| 2014/0012446 A1* | 1/2014 | Kumar | B60W 20/00 |
| | | | 701/22 |
| 2014/0091746 A1* | 4/2014 | Fujishima | H02K 19/38 |
| | | | 318/538 |
| 2014/0139016 A1* | 5/2014 | Lovercheck | B60L 1/003 |
| | | | 307/9.1 |
| 2015/0132163 A1* | 5/2015 | Wright | B60K 6/547 |
| | | | 417/420 |
| 2015/0343908 A1 | 12/2015 | Mirzaei | |
| 2016/0308477 A1* | 10/2016 | Lim | H02P 27/06 |
| 2018/0076663 A1* | 3/2018 | Gudgel | H02J 3/387 |
| 2019/0084444 A1* | 3/2019 | Ge | B60L 15/007 |
| 2019/0135118 A1* | 5/2019 | Moon | H02J 7/022 |

\* cited by examiner

ISOLATED DUAL BUS HYBRID VEHICLE DRIVETRAIN

TECHNICAL FIELD

This application is generally related to a hybrid vehicle powertrain having dual electric machines each having an isolated DC/AC converter and each operating at independent voltages.

BACKGROUND

Electrified vehicles (EVs) including hybrid-electric vehicles (HEVs) and battery electric vehicles (BEVs) rely on a traction battery to provide power to a traction motor for propulsion and a power inverter therebetween to convert direct current (DC) power to alternating current (AC) power. The typical AC traction motor is a 3-phase motor that may be powered by 3 sinusoidal signals each driven with 120 degrees phase separation. The traction battery is configured to operate in a particular voltage range and provide a current. The traction battery is alternatively referred to as a high-voltage battery. However, improved performance of electric machines may be achieved by operating in a different voltage range, typically at voltages greater than the traction battery terminal voltage. Likewise, the current requirements to drive a vehicular electric machine are commonly referred to as high current.

Also, many electrified vehicles include a DC-DC converter, also referred to as a variable voltage converter (VVC), to convert the voltage of the traction battery to an operational voltage level of the electric machine. The electric machine, which may include a traction motor and a generator, may require high voltage and high current. Due to the voltage and current requirements, a battery module and a power electronics module are typically in continuous communication.

SUMMARY

A powertrain for a vehicle includes a Y-wound generator, a Y-wound motor, a generator inverter, a motor inverter, and a traction battery. The Y-wound generator and Y-wound motor are coupled via each respective neutral terminal. The generator inverter is coupled between the Y-wound generator and a generator bus and the motor inverter is coupled between the Y-wound motor and a motor bus. The traction battery has a first terminal coupled to each neutral terminal and a second terminal coupled to bus terminals of the generator and motor bus.

A powertrain control method includes a propulsion mode. In the propulsion mode, current is directed from a battery to a first neutral terminal of a first electric machine and a second neutral terminal of a second electric machine, a first set of switches of a first inverter are modulated to output a first bus voltage; and a second set of switches of a second inverter are modulated to output a second bus voltage that is different from the first bus voltage.

A vehicle powertrain includes a generator, a motor, and a traction battery. The generator has a first neutral terminal. The motor has a second neutral terminal that is coupled with the first neutral terminal The traction battery has a first terminal coupled to the first and second neutral terminals.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A typical drive system for EVs/HEVs may include a direct current (DC) power source (i.e., high-voltage battery), a variable voltage converter (VVC), an inverter and an electric machine. The VVC may be a bi-directional boost converter that is configured to boost a voltage of the battery to an operating voltage of the motor/generator and inverter. A practical aspect of the typical drive system includes, as an increase of power is demanded, multiple power devices connected in parallel may be needed to output higher current/higher power to meet the demand. The connection of multiple power devices in parallel may result in a current sharing problem between the power devices connected in parallel. A result of the current sharing problem is that system efficiency may be compromised. Also, in the typical drive system, an output voltage range of a boost converter may then be limited as the efficiency is decreased based on a boost ratio, that is High-Voltage DC voltage (Vdc) to the input battery (Vb) (e.g., Vdc/Vb>2). To improve the electric powertrain (e-drive) performance, a VVC that features a wide output voltage range is desired.

Figure 1:
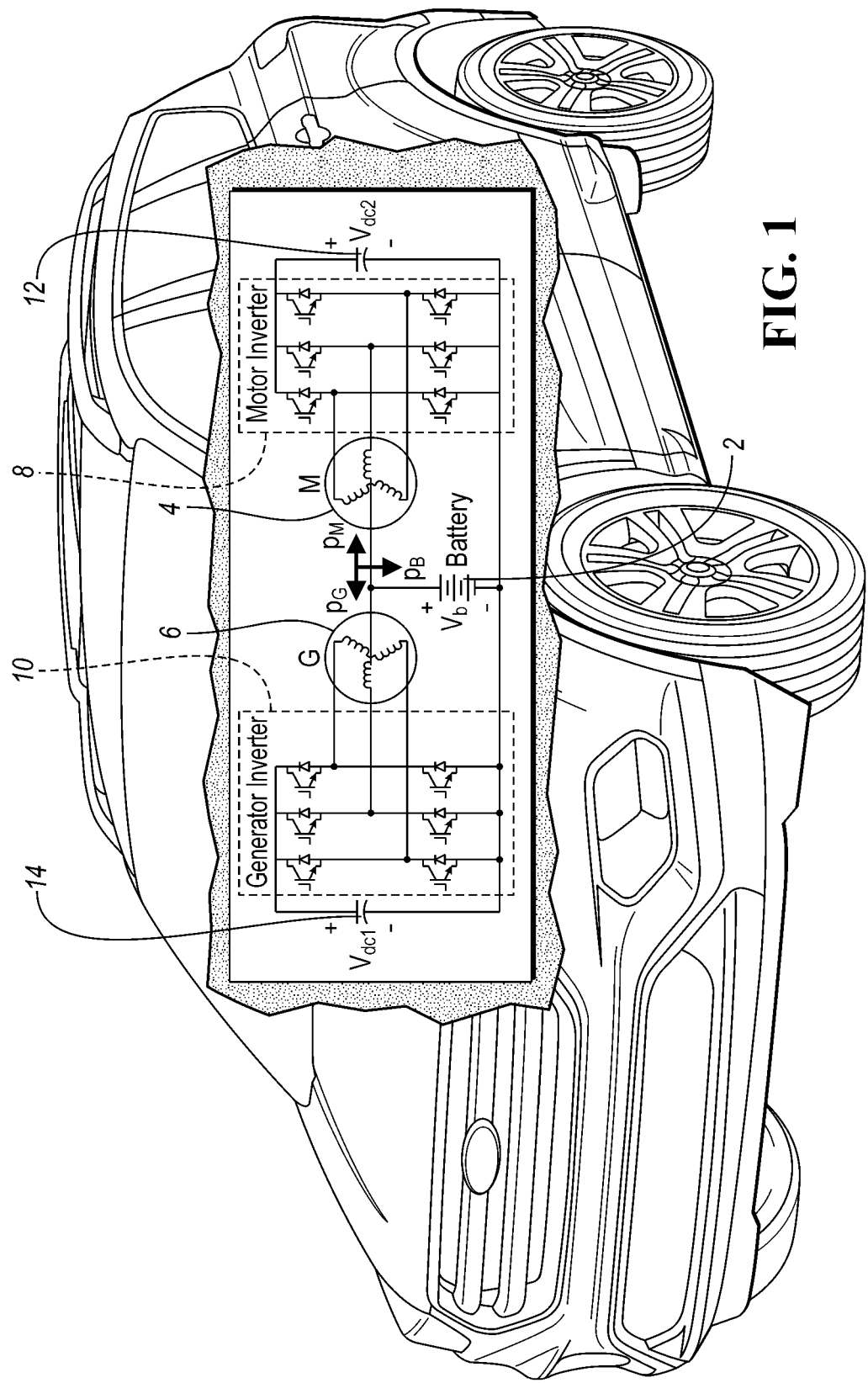
FIG. 1 is a diagram of an electrified vehicle with a dual electric machine powertrain that is powered through each electric machine's neutral terminal by a traction battery.

FIG. 1 depicts a hybrid electric vehicle illustrating internal electric powertrain components configured to flow a current through windings of a motor 4 by operating the motor inverter 8, DC bus 12, and a high voltage traction battery 2, also to flow a current through windings of a generator 6 by operating the generator inverter 10, DC bus 14, and a high voltage traction battery 2.

Figure 2:
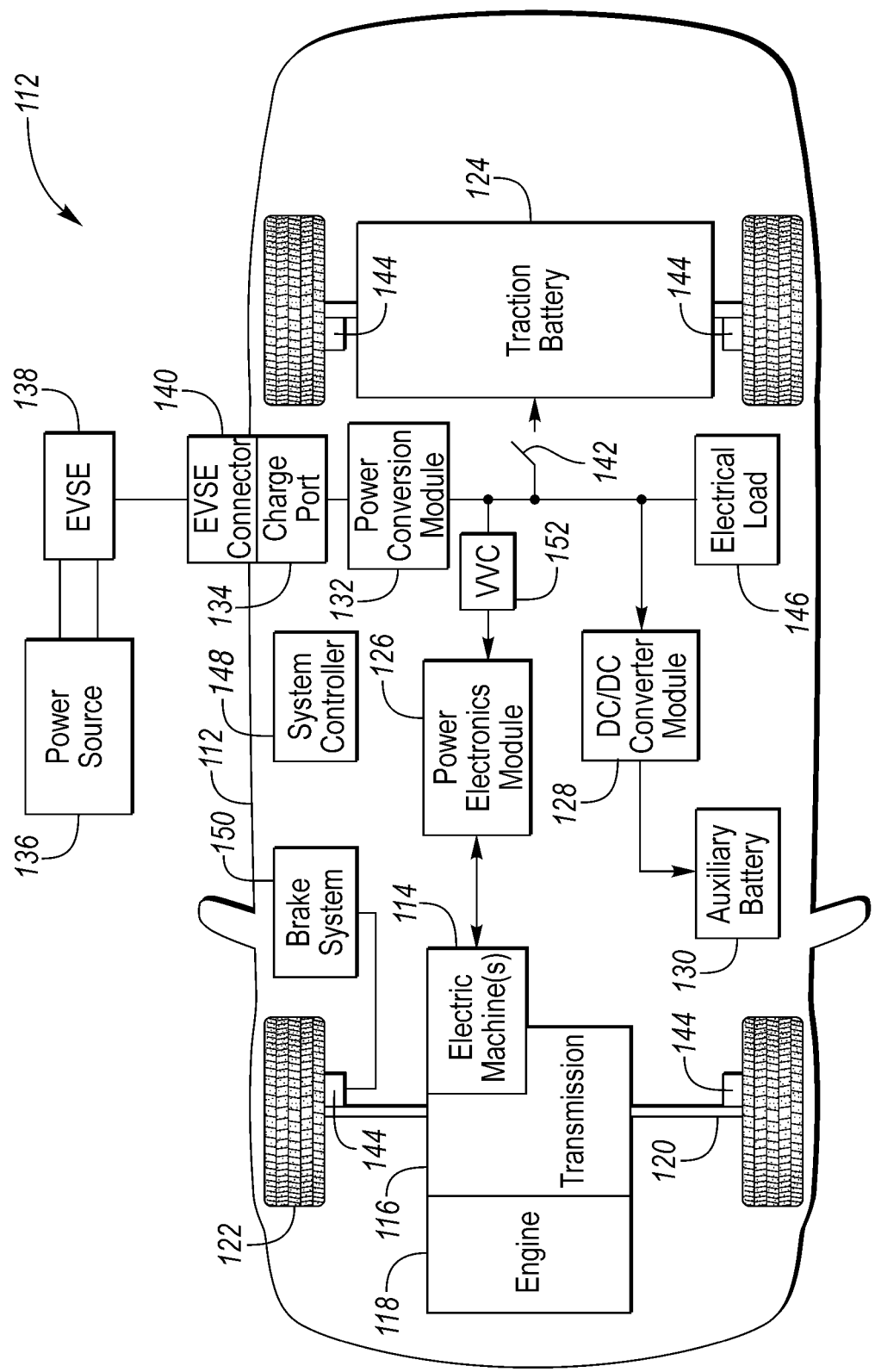
FIG. 2 is a diagram of a hybrid vehicle illustrating typical drivetrain and energy storage components including a variable voltage converter.

FIG. 2 depicts an electrified vehicle 112 that may be referred to as a plug-in hybrid-electric vehicle (PHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and deceleration capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present. In other configurations, the electrified vehicle 112 may be a full hybrid-electric vehicle (FHEV) without plug-in capability.

A traction battery or battery pack 124 stores energy that can be used by the electric machines 114. The vehicle battery pack 124 may provide a high-voltage direct current (DC) output. The traction battery 124 may be electrically coupled to one or more power electronics modules 126. One or more contactors 142 may isolate the traction battery 124 from other components when opened and connect the traction battery 124 to other components when closed. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

The vehicle 112 may include a variable-voltage converter (VVC) 152 electrically coupled between the traction battery 124 and the power electronics module 126. The VVC 152 may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high-voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems may be electrically coupled to the auxiliary battery 130. One or more electrical loads 146 may be coupled to the high-voltage bus. The electrical loads 146 may have an associated controller that operates and controls the electrical loads 146 when appropriate. Examples of electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 2 but it may be implied that the vehicle network may connect to any electronic module that is present in the vehicle 112. A vehicle system controller (VSC) 148 may be present to coordinate the operation of the various components.

Often the VVC 152 is configured as a boost converter. The VVC 152 may include input terminals that may be coupled to terminals of the traction battery 124 through the contactors 142. The VVC 152 may include output terminals coupled to terminals of the power electronics module 126. The VVC 152 may be operated to cause a voltage at the output terminals to be greater than a voltage at the input terminals. The vehicle 112 may include a VVC controller that monitors and controls electrical parameters (e.g., voltage and current) at various locations within the VVC 152. In some configurations, the VVC controller may be included as part of the VVC 152. The VVC controller may determine an output voltage reference, $V^*_{dc}$. The VVC controller may determine, based on the electrical parameters and the voltage reference, $V^*_{dc}$, a control signal sufficient to cause the VVC 152 to achieve the desired output voltage. In some configurations, the control signal may be implemented as a pulse-width modulated (PWM) signal in which a duty cycle of the PWM signal is varied. The control signal may be operated at a predetermined switching frequency. The VVC controller may command the VVC 152 to provide the desired output voltage using the control signal. The particular control signal at which the VVC 152 is operated may be directly related to the amount of voltage boost to be provided by the VVC 152.

With reference to FIG. 2, the VVC 152 may boost or "step up" the voltage potential of the electrical power provided by the traction battery 124. The traction battery 124 may provide high-voltage (HV) DC power. In some configurations, the traction battery 124 may provide a voltage between 150 and 400 Volts. The contactor 142 may be electrically coupled in series between the traction battery 124 and the VVC 152. When the contactor 142 is closed, the HV DC power may be transferred from the traction battery 124 to the VVC 152. An input capacitor may be electrically coupled in parallel to the traction battery 124. The input capacitor may reduce any voltage and current ripple. The VVC 152 may receive the HV DC power and boost or "step up" the voltage potential of the input voltage according to the duty cycle. Often an output capacitor is electrically coupled between the output terminals of the VVC 152 and the input of the power electronics module 126 to stabilize the bus voltage and reduce voltage and current ripple at the output of the VVC 152.

Figure 3:
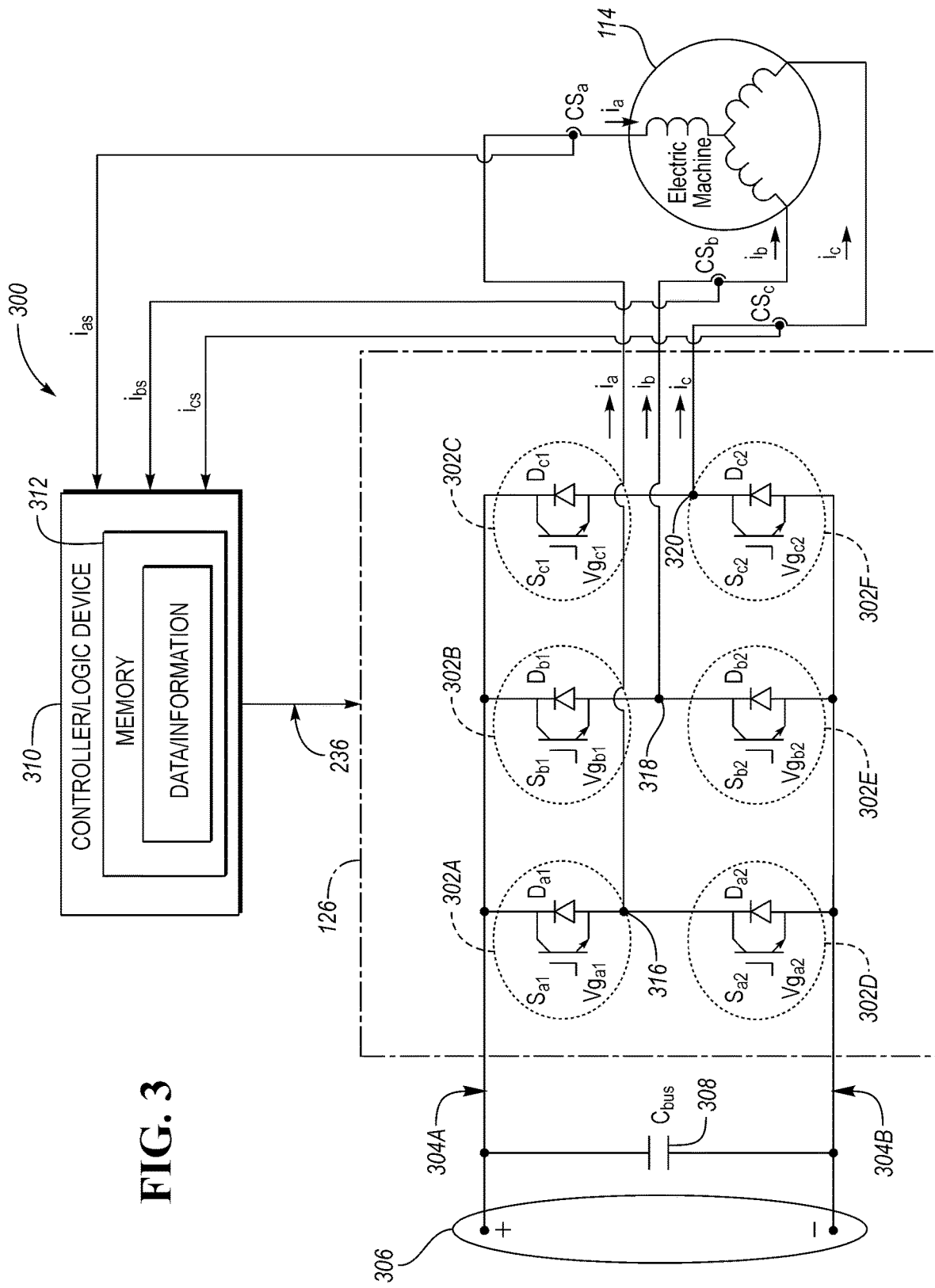
FIG. 3 is a schematic diagram of a power inverter of a power electronics module.

With reference to FIG. 3, a system 300 is provided for controlling a power electronics module (PEM) 126. The PEM 126 of FIG. 3 is shown to include a plurality of switches 302 (e.g., IGBTs) configured to collectively operate as an inverter with first, second, and third phase legs 316, 318, 320. While the inverter is shown as a three-phase converter, the inverter may include additional phase legs. For example, the inverter may be a four-phase converter, a five-phase converter, a six-phase converter, etc. In addition, the PEM 126 may include multiple converters with each inverter in the PEM 126 including three or more phase legs. For example, the system 300 may control two or more inverters in the PEM 126. The PEM 126 may further include a DC to DC converter having high power switches (e.g., IGBTs) to convert a power electronics module input voltage to a power electronics module output voltage via boost, buck or a combination thereof.

As shown in FIG. 3, the inverter may be a DC-to-AC converter. In operation, the DC-to-AC converter receives DC power from a DC power link 306 through a DC bus 304 and converts the DC power to AC power. The AC power is transmitted via the phase currents ia, ib, and is to drive an AC machine also referred to as an electric machine 114, such as a three-phase permanent-magnet synchronous motor (PMSM) as depicted in FIG. 3. In such an example, the DC power link 306 may include a DC storage battery to provide DC power to the DC bus 304. In another example, the inverter may operate as an AC-to-DC converter that converts AC power from the AC machine 114 (e.g., generator) to DC power, which the DC bus 304 can provide to the DC power link 306. Furthermore, the system 300 may control the PEM 126 in other power electronic topologies.

With continuing reference to FIG. 3, each of the phase legs 316, 318, 320 in the inverter includes power switches 302, which may be implemented by various types of controllable switches. In one embodiment, each power switch 302 may include a diode and a transistor, (e.g., an IGBT). The diodes of FIG. 3 are labeled $D_{a1}$, $D_{a2}$, $D_{b1}$, $D_{b2}$, $D_{c1}$, and $D_{c2}$ while the IGBTs of FIG. 3 are respectively labeled $S_{a1}$, $S_{a2}$, $S_{b1}$, $S_{b2}$, $S_{c1}$, and $S_{c2}$. The power switches $S_{a1}$, $S_{a2}$, $D_{a1}$, and $D_{a2}$ are part of phase leg A of the three-phase converter, which is labeled as the first phase leg A 316 in FIG. 3. Similarly, the power switches $S_{b1}$, $S_{b2}$, $D_{b1}$, and $D_{b2}$ are part of phase leg B 318 and the power switches $S_{c1}$, $S_{c2}$, $D_{c1}$, and $D_{c2}$ are part of phase leg C 320 of the three-phase converter. The inverter may include any number of the power switches 302 or circuit elements depending on the particular configuration of the inverter. The diodes ($D_{xx}$) are connected in parallel with the IGBTs ($S_{xx}$) however, as the polarities are reversed for proper operation, this configuration is often referred to as being connected anti-parallel. A diode in this anti-parallel configuration is also called a freewheeling diode.

As illustrated in FIG. 3, current sensors $CS_a$, $CS_b$, and $CS_c$ are provided to sense current flow in the respective phase legs 316, 318, 320. FIG. 3 shows the current sensors $CS_a$, $CS_b$, and $CS_c$ separate from the PEM 126. However, current sensors $CS_a$, $CS_b$, and $CS_c$ may be integrated as part of the PEM126 depending on its configuration. Current sensors $CS_a$, $CS_b$, and $CS_c$ of FIG. 3 are installed in series with each of phase legs A, B and C (i.e., phase legs 316, 318, 320 in FIG. 3) and provide the respective feedback signals $i_{as}$, $i_{bs}$, and $i_{cs}$ (also illustrated in FIG. 3) for the system 300. The feedback signals $i_{as}$, $i_{bs}$, and $i_{cs}$ may be raw current signals processed by logic device (LD) 310 or may be embedded or encoded with data or information about the current flow through the respective phase legs 316, 318, 320. Also, the power switches 302 (e.g., IGBTs) may include current sensing capability. The current sensing capability may include being configured with a current mirror output, which may provide data/signals representative of $i_{as}$, $i_{bs}$, and $i_{as}$. The data/signals may indicate a direction of current flow, a magnitude of current flow, or both the direction and magnitude of current flow through the respective phase legs A, B, and C.

Referring again to FIG. 3, the system 300 includes a logic device (LD) or controller 310. The controller or LD 310 can be implemented by various types or combinations of electronic devices and/or microprocessor-based computers or controllers. To implement a method of controlling the PEM 126, the controller 310 may execute a computer program or algorithm embedded or encoded with the method and stored in volatile and/or persistent memory 312. Alternatively, logic may be encoded in discrete logic, a microprocessor, a microcontroller, or a logic or gate array stored on one or more integrated circuit chips. As shown in the embodiment of FIG. 3, the controller 310 receives and processes the feedback signals $i_{as}$, $i_{bs}$, and $i_{cs}$ to control the phase currents $i_a$, $i_b$, and $i_c$ such that the phase currents $i_a$, $i_b$, and $i_c$ flow through the phase legs 316, 318, 320 and into the respective windings of the electric machine 114 according to various current or voltage patterns. For example, current patterns can include patterns of phase currents $i_a$, $i_b$, and $i_c$ flowing into and away from the DC-bus 304 or a DC-bus capacitor 308. The DC-bus capacitor 308 of FIG. 3 is shown separate from the PEM 126. However, the DC-bus capacitor 308 may be integrated as part of the PEM 126.

As shown in FIG. 3, a storage medium 312 (hereinafter "memory"), such as computer-readable memory may store the computer program or algorithm embedded or encoded with the method. In addition, the memory 312 may store data or information about the various operating conditions or components in the PEM 126. For example, the memory 312 may store data or information about current flow through the respective phase legs 316, 318, 320. The memory 312 can be part of the controller 310 as shown in FIG. 3. However, the memory 312 may be positioned in any suitable location accessible by the controller 310.

As illustrated in FIG. 3, the controller 310 transmits at least one control signal 236 to the power converter system 126. The power converter system 126 receives the control signal 236 to control the switching configuration of the inverter and therefore the current flow through the respective phase legs 316, 318, and 320. The switching configuration is a set of switching states of the power switches 302 in the inverter. In general, the switching configuration of the inverter determines how the inverter converts power between the DC power link 306 and the electric machine 114.

To control the switching configuration of the inverter, the inverter changes the switching state of each power switch 302 in the inverter to either an ON state or an OFF state based on the control signal 236. In the illustrated embodiment, to switch the power switch 302 to either ON or OFF states, the controller/LD 310 provides the gate voltage (Vg) to each power switch 302 and therefore drives the switching state of each power switch 302. Gate voltages $Vg_{a1}$, $Vg_{a2}$, $Vg_{b1}$, $Vg_{b2}$, $Vg_{c1}$, and $Vg_{c2}$ (shown in FIG. 3) control the switching state and characteristics of the respective power switches 302. While the inverter is shown as a voltage-driven device in FIG. 3, the inverter may be a current-driven device or controlled by other strategies that switch the power switch 302 between ON and OFF states. The controller 310 may change the gate drive for each IGBT based on the rotational speed of the electric machine 114, the mirror current, or a temperature of the IGBT switch. The change in gate drive may be selected from a plurality of gate drive currents in which the change gate drive current is proportional to a change in IGBT switching speed.

As also shown in FIG. 3, each phase leg 316, 318, and 320 includes two switches 302. However, only one switch in each of the legs 316, 318, 320 can be in the ON state without shorting the DC power link 306. Thus, in each phase leg, the switching state of the lower switch is typically opposite the switching state of the corresponding upper switch. The top switches are typically referred to as high-side switches (i.e., 302A, 302B, 302C) and the lower switches are typically referred to as low-side switches (i.e., 302D, 302E, 302F). Consequently, a HIGH state of a phase leg refers to the upper switch in the leg in the ON state with the lower switch in the OFF state. Likewise, a LOW state of the phase leg refers to the upper switch in the leg in the OFF state with the lower switch in the ON state. IGBTs with current mirror capability may be on all IGBTs, a subset of IGBTs (e.g., $S_{a1}$, $S_{b1}$, $S_{c1}$) or a single IGBT.

Two situations can occur during an active state of the three-phase converter example illustrated in FIG. 3: (1) two phase legs are in the HIGH state while the third phase leg is in the LOW state, or (2) one phase leg is in the HIGH state while the other two phase legs are in the LOW state. Thus, one phase leg in the three-phase converter, which may be defined as the "reference" phase for a specific active state of the inverter, is in a state opposite to the other two phase legs, or "non-reference" phases, that have the same state. Consequently, the non-reference phases are either both in the HIGH state or both in the LOW state during an active state of the inverter.

Solid state devices (SSD), such as Insulated Gate Bipolar Junction Transistors (IGBTs), Metal Oxide Semiconductor Field Effect Transistors (MOSFETs), or Bipolar Junction Transistors (BJTs) are widely used in a variety of automotive and industrial applications, such as electric motor drives, power inverters, DC-DC converters, and power modules. Operation of an IGBT and a MOSFET is voltage controlled, in which the operation is based on a voltage applied to a gate of the IGBT or MOSFET, while operation of a BJT is current controlled, in which the operation is based on a current applied to a base of the BJT. Here, the use of SSDs or high-power relays may be used to control, alter, or modulate a current between a battery and an electric machine of a vehicle.

Figure 4:
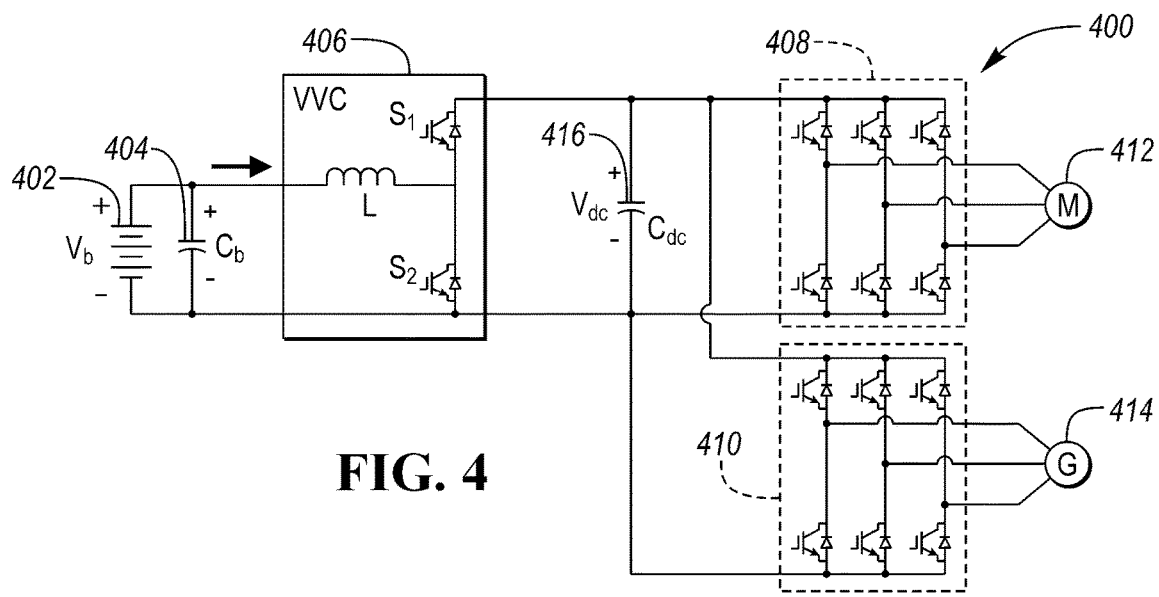
FIG. 4 is a diagram of a hybrid vehicle powertrain including a traction battery, a variable voltage converter, dual inverters, and dual electric machines.

FIG. 4 is a diagram of a hybrid vehicle powertrain 400 including a traction battery 402, a DC bus capacitor 404, a variable voltage converter 406, dual inverters 408 and 410, and dual electric machines 412 and 414. Here, a power split configuration of a Hybrid Electric Vehicle (HEV) drive system is illustrated including a traction motor 412 and traction motor inverter 408, a generator 414 and generator inverter 410, a DC bus capacitor 416, a variable voltage converter (VVC) 406, a battery capacitor 404, and a traction battery 402. Both the motor (M) 412 and generator (G) 414 can operate in propulsion mode or electricity generating mode, the former operation mode converts power/energy into a force, and the latter operating mode converts kinetic energy into electric power/energy. The motor/inverter, generator/inverter and battery are coupled via the capacitor based DC bus, where low voltage of battery is boosted by the VVC to a high level for enhancing performance of the traction motor drive.

This powertrain (E-drive system) as shown in FIG. 4 has advantages and drawbacks. First, a single DC bus is shared by the VVC 406, motor inverter 408, and generator inverter 410 resulting in a single DC bus voltage being applied to both motor inverter 408 and generator inverter 410. Use of a single DC bus voltage may result in an increased power loss in the motor and generator inverters.

Generally, voltages across stator winding within the motor and generator are related to their respective rotor speeds. A high rotor speed typically corresponds to a high motor/generator voltage, while a low rotor speed typically corresponds to a low motor/generator voltage. In some embodiments, the motor and generator may operate at different rotor speeds. For example, one may be operating in high speed mode requiring a high stator voltage, while the other one may be operated in low speed mode with a low stator voltage. With the E-drive system shown in FIG. 4, a high DC bus voltage and a low modulation index are required to achieve a low motor stator voltage if the generator is operating in a high-speed mode while the motor operates in low speed mode. This may result in a high DC bus voltage that causes a high-power loss of motor inverter. Likewise, a high DC bus voltage and a low modulation index are required for the generator inverter/VVC to achieve a low generator stator voltage if motor is operated in a high-speed mode while the generator is operated in a low speed mode. This may result in a high DC bus voltage that causes a high-power loss in the generator inverter.

Further, the dual electric machine system 400 typically requires a VVC 406 to ensure a desired DC bus voltage may be generated regardless of a power usage of the motor drive or the generator drive during propulsion or generating. There are some drawbacks to the VVC 406, for example, a VVC is bulky and may be difficult to package in the vehicle, and the VVC 406 has an inductor and power switches that typically have high power losses resulting in low efficiency of the E-drive system. During operation, the inductor may get hot thereby requiring cooling which may be difficult. The combination of additional cooling in a system already difficult to find space for exacerbates the issues and add to the extra cost and weight of the VVC 406. And in some embodiments, the magnetic core of the inductor may have temperature-sensitive performance in which the magnetic core is easily saturated in high temperatures making the VVC performance unstable over some operating conditions.

Here, a dual electric machine system is configured to operate with separate DC buses without a variable voltage converter using a Y-wound motor and a Y-wound generator and flowing power to and from the Y-wound electric machines via the neutral terminal.

Figure 5:
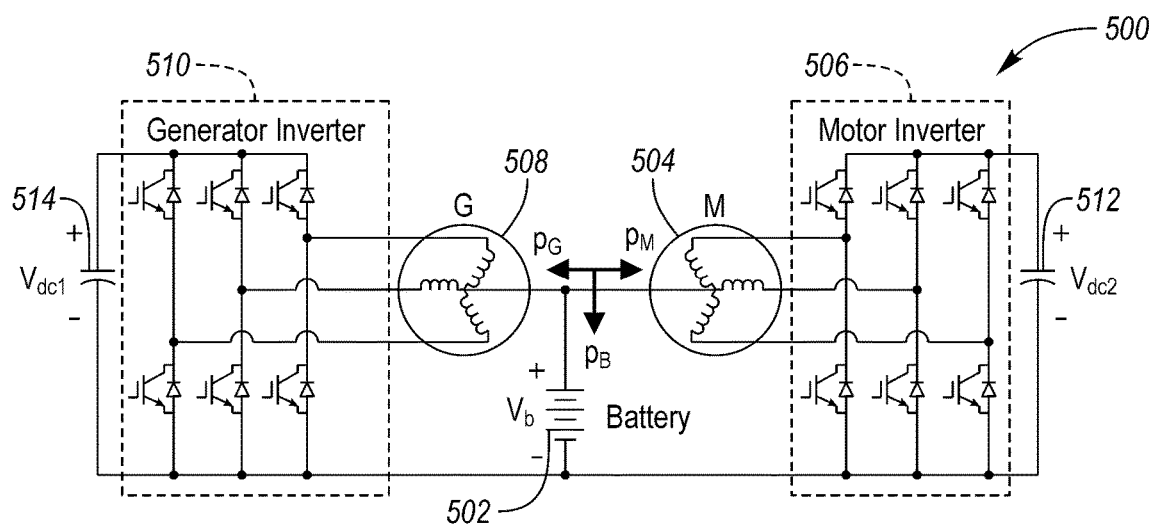
FIG. 5 is a diagram of a dual electric machine powertrain that is powered through each electric machine's neutral terminal by a traction battery.

FIG. 5 is a diagram of a dual electric machine powertrain 500 that flows power from a battery 502 (e.g., traction battery) to a first electric machine 504 (motor) and motor inverter 506 and a second electric machine 508 (generator) and the generator inverter 510. The battery 502 is coupled with each electric machine's neutral terminal such that power flows to and from the battery 502 from the neutral terminals of the motor 504 and generator 508. The power passes through the inverters to a bus storage capacitor. For example, on the motor side, power moves from the battery 502 to the motor 504 and motor inverter 506 to the motor DC bus capacitor 512, while on the generator side, power moves from the battery 502 to the generator 508 and generator inverter 510 to the generator DC bus capacitor 514.

The separate DC bus based E-drive system 500 in a HEV allows for the motor and generator inverters to be separately controlled having their own DC buses. The separate DC busses allow each DC bus voltage to be independently varied to meet the voltage requirements of the electric machines operating at different speeds and possibly in different operating modes. For example, one electric machine may be charging while the other may be providing a torque. This also allows the losses to be controlled, for example, a low DC bus voltage may be applied to provide a low motor/generator stator voltage at low speeds thus reducing the inverter power loss. The separate DC buses aid in a reduction of inverter power loss by overcoming issues of coupled DC bus shown in FIG. 4. For example, if the motor 504 runs at a high speed but the generator 508 operates at a low speed, the motor and generator inverters (506 and 510) will have two DC bus voltages, the motor DC bus at a high DC bus voltage, and generator DC bus at a low DC bus voltage to reduce power loss.

As there is no VVC in the E-drive system 500, VVC-related drawbacks list above may be avoided. In the E-drive system 500, the stator winding's neutral points of the generator 508 and motor 504 are coupled together to form a common neutral point. The battery 502 is coupled between the common neutral point and DC bus negative rail. The motor inverter 506 controls the motor's 504 operation and also controls the DC bus voltage Vdc2 at the motor bus capacitor 512. Likewise, generator inverter 510 controls the generator's 508 operation and also controls the DC bus voltage Vdc1 at the generator bus capacitor 514. Both the motor 504 and generator 508 can operate in a propulsion and energy generating mode, the traction battery 502 can be in charging/discharging (or non-charging and non-discharging) mode. Here, the two inverters manage three sources (the motor 504, the generator 508, and the battery 502), all having bidirectional power flows, and two DC bus voltages Vdc1 at generator bus capacitor 514 and Vdc2 at motor bus capacitor 512 that may be independently controlled having different levels to meet the operational demands of the motor 504 and generator 508 operating at different speeds.

Figure 6:
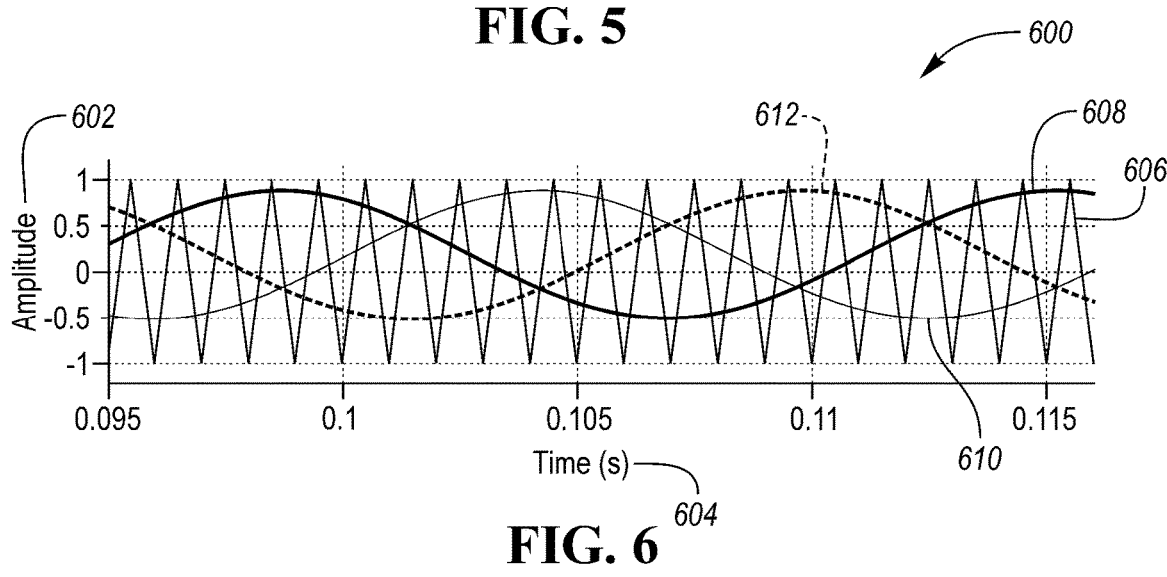
FIG. 6 is a graphical representation of a modulation method to control a dual electric machine powertrain that is powered through each electric machine's neutral terminal by a traction battery.

FIG. 6 is a graphical representation 600 of a modulation method to control a dual electric machine powertrain that is powered through each electric machine's neutral terminal by a traction battery. This modulation method illustrates signal 602 with respect to time 604 in which a carrier signal 606 is super imposed with each phase sinusoidal component having a DC offset (608, 610, and 612). Referring to FIG. 5, the motor and generator inverter (e.g., 506 and 510) may employ the same modulation method 600. The modulation signals are compared with the carrier in FIG. 6 to control switches of motor/generator inverter (e.g., 506 and 510) include sinusoidal components $m_a$, $m_b$, $m_c$, and DC offset component $D_{bat}$. Here, waveform 608 is $m_a+D_{bat}$, 610 is $m_b+D_{bat}$, and 612 is $m_c+D_{bat}$. The $m_a$, $m_b$, and $m_c$ phase components are used to control line-to-line voltages of motor/generator, the duty cycle $D_{bat}$ controls the DC bus voltage. For the motor inverter (e.g., 506), $D_{bat}=D_M$, $m_a=m_{U1}$, $m_b=m_{V1}$, $m_c=m_{W1}$; for the generator inverter (e.g., 510), $D_{bat}=D_G$, $M_a=m_{U2}$, $m_b=m_{V2}$, $m_c=m_{W2}$. The two DC bus voltages in FIG. 5 may be represented by $$V_{dc1} = \frac{2V_b}{1+D_G} \quad (1)$$

$$V_{dc2} = \frac{2V_b}{1+D_M} \quad (2)$$

in which $V_{dc1}$ is the DC bus voltage of the generator capacitor 514, $V_{dc2}$ is the DC bus voltage of the motor capacitor 512, $-1<D_G<1$, $-1<D_M<1$, and $V_b$ is the voltage of battery 502. Based on this representation is it shown that each DC bus voltage may be individually controlled over a wide operating range. For example, during the low speed operation of the motor/generator, a low DC bus voltage of motor/generator inverter is available to reduce inverter power loss. And during high speed operation of the motor/generator, a high DC bus voltage can be achieved to provide the demanded motor/generator voltage. Here, the motor inverter (e.g., 506) is controlled to have a high DC bus voltage by adjusting $D_M$ when the motor (e.g., 504) operates at a high speed, while the DC bus voltage of generator inverter (e.g., 510) is controlled to have a low level by adjusting $D_G$ when the generator (e.g., 508) operates at a low speed. This allows a greater reduction in power losses of motor and generator inverters.

Here, two carrier waveforms for the motor and generator inverters have substantially a 180° phase shift to achieve interleave control reducing battery current ripple significantly.

Here, the sum of motor and generator powers are balanced by the battery power such that pM+pG+pB=0. In general there are three operating modes, First is when the traction battery has no charging or discharging due to the motor and generator power being balanced (i.e., pM+pG=0, pB=0). Next is when the traction battery is charged and the sum of the motor and generator power is less than zero (i.e., total generating power is greater than the total propulsive power, pM+pG<0, pB>0). Third is when the traction battery is discharging when the sum of the motor and generator power is greater than zero (i.e., total generating power is less than total propulsive power, pM+pG>0, pB<0).

The system of FIG. 5 is such that each phase stator winding of the motor/generator has two current components. The first current component is a sinusoidal current that produces motor/generator torque and the second current component is a DC current component which is one-third of total DC current flowing through neutral point of motor/generator windings. This DC current component does not produce torque on motor/generator rotor, so it does not affect operation of motor/generator.

Three example operational modes are discussed to describe the E-drive system shown in FIG. 5. In a first operating mode, the generator 508 generates power in a high-speed mode while the motor 504 consumes power in a low speed mode, and the battery 502 is charged. In a second operating mode, the generator 508 generates power in a low speed mode while the motor 504 consumes power in a high-speed mode, and the battery 502 is discharged. And in a third operating mode, the generator 508 generates power in a high-speed mode while the motor 504 generates power in a low speed mode, and the battery 502 is charged.

Figure 7A:
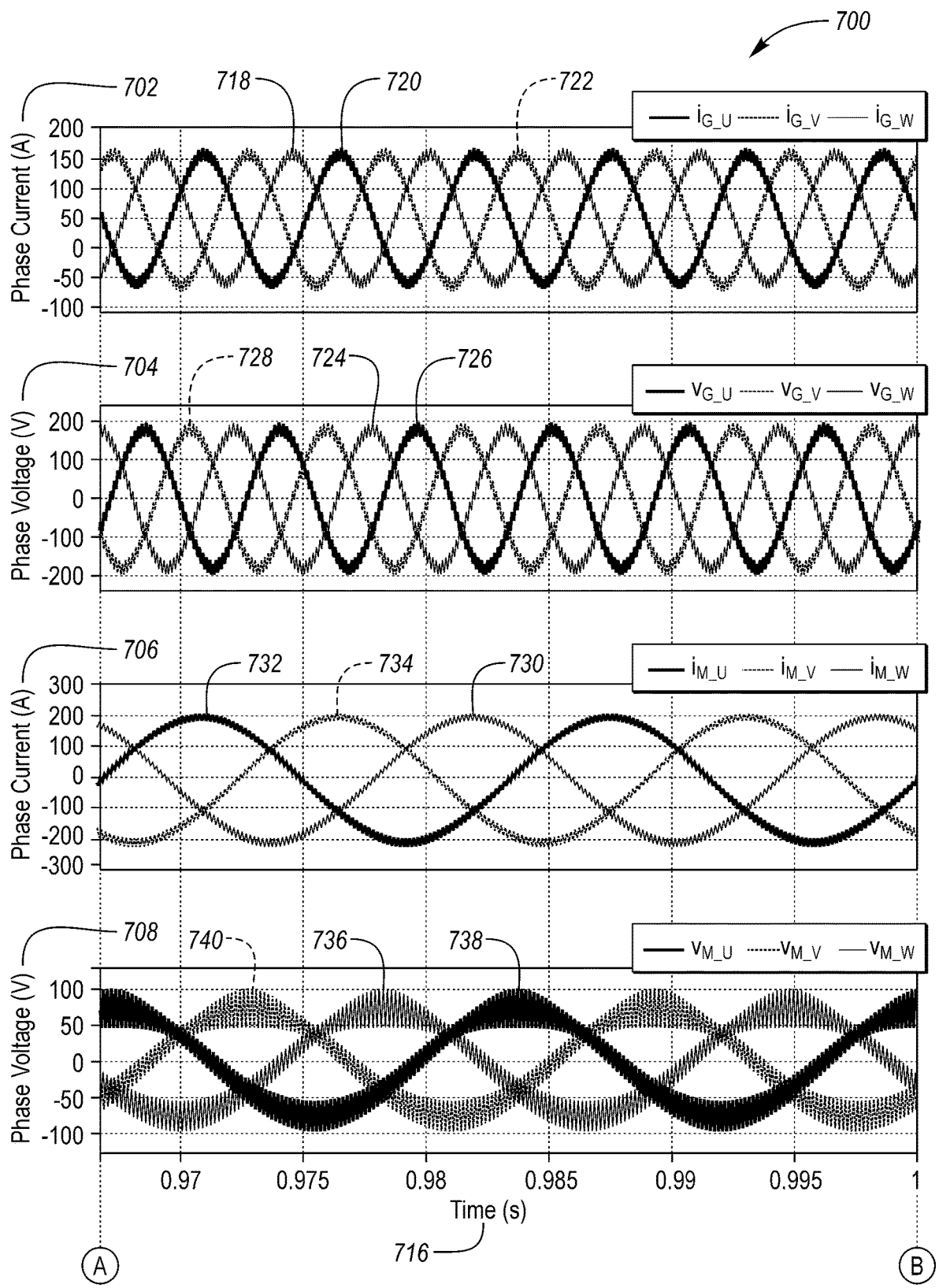
FIGS. 7A and 7B are graphical representations of system electrical characteristics with respect to time for an isolated dual bus hybrid vehicle drivetrain.
Figure 7B:
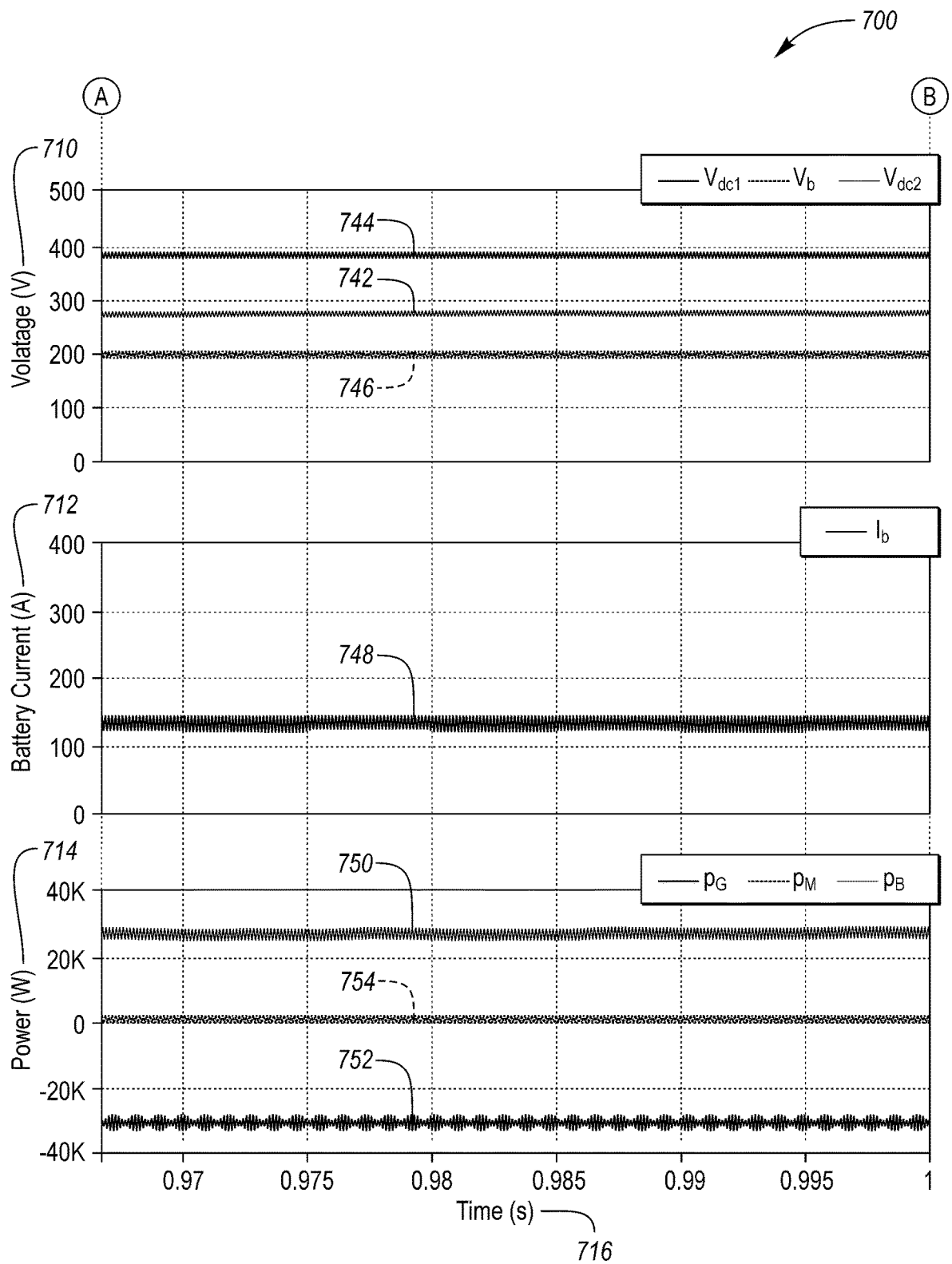

FIGS. 7A and 7B are graphical representations of system electrical characteristics with respect to time. FIG. 7A illustrates a generator phase current 702, a generator phase voltage 704, a motor phase current 706, and a motor phase voltage 708 with respect to time 716. Likewise, FIG. 7B illustrates a DC bus voltage 710, battery current 712, and power 714 with respect to time 716. Referring back to FIG. 7A, the generator phase current 702 includes a generator w current 718, a generator u current 720, and a generator v current 722 with respect to time 716. Along with a generator phase voltage 704 that includes a generator w voltage 724, a generator u voltage 726, and a generator v voltage 728 with respect to time 716. Further the motor phase current 706 includes a motor v current 734, a motor u current 732, and a motor w current 730 with respect to time 716, and the motor phase voltage 708 that includes a motor v voltage 740, a motor u voltage 738, and a motor w voltage 736 with respect to time 716.

Here, the system (e.g., 500) is operating in the first operating mode, namely when the generator generates power in a high-speed mode, the motor consumes power in a low-speed mode, and the battery is charged. FIGS. 7A and 7B illustrate electrical characteristics during this first operating mode. A high DC bus voltage $V_{dc1}$ 744 of the generator inverter is achieved to support the generator running in a high-speed mode, a low DC bus voltage $V_{dc2}$ 742 is powering the motor inverter to support the motor operating in a low-speed mode, while a voltage 746 is being applied to the battery (e.g., 502). As shown in FIGS. 7A and 7B, the generator voltage ($v_{G_U}$ 726, $v_{G_V}$ 728, and $v_{G_W}$ 724 are three phase voltages) are approximately 130 V rms with a 384 V DC bus voltage $V_{dc1}$ 744. The motor voltage, in which the three phase voltages are $v_{M_U}$ 738, $V_{M_V}$ 740, and $V_{M_W}$ 736, is 54 V rms with a 275-V DC bus voltage $V_{dc2}$ 742. The 79 A rms AC phase current makes the generator produce 30 kW of power ($p_G$) 752 in the high-speed mode, the motor has 141-A rms AC phase current and consumes 1.5-kW power ($p_M$) 754 in the low speed mode. This results in the battery being charged with $p_B$=27.6 kW 750 at a battery voltage $V_b$=200 V 746. The generator stator windings carry a 49.7 Amp DC current component to deliver the generating power (to neutral point) and motor stator windings carry a 3.4-A DC current component to consume power (from neutral point). The power difference 750 is charged into battery. In this illustration, the generator phase frequency indicated by elements 718, 720, 722, 724, 726, and 728 are twice the frequency of the motor phase frequency indicated by elements 730, 732, 734, 736, 738, and 740.

The second case is when the generator generates power in a low-speed mode while, the motor consumes power in a high-speed mode, and the battery is discharged.

Analysis of this case were that the low DC bus voltage $V_{dc1}$ of the generator inverter is achieved to support the generator running in a low-speed mode, while a high DC bus voltage $V_{dc2}$ is converted in the motor inverter to support the motor operating in a high-speed mode. Here a generator voltage is 64 V rms with a 290 V DC bus voltage $V_{dc1}$. The motor voltage is 138 V rms with a 395 V DC bus voltage $V_{dc2}$. While the 141 A rms AC phase current of the generator produces 15-kW power $p_G$, the motor having a 141-A rms AC phase current and consuming 53.7-kW power $p_M$ in a high-speed mode. This resulted in the battery being discharged at $p_B$=40 kW at a battery voltage $V_b$=200 V. The generator stator windings carried 23.8 A DC current to deliver the generating power to neutral point of the Y-wound electric machine and motor stator windings carried 91 A DC current to consume power from neutral point. The power difference is the amount that the battery discharges. In this example, the generator phase frequency may be similar to elements 730, 732, 734, 736, 738, and 740 that would be at or less than half of the frequency of the motor phase frequency that may be similar to elements 718, 720, 722, 724, 726, and 728.

In the third case, the generator generates power in a high-speed mode while the motor generates power in a low-speed mode as the battery is charged.

Here a high DC bus voltage $V_{dc1}$ of the generator inverter is achieved to support the generator running in a high-speed mode while the low DC bus voltage $V_{dc2}$ supports the motor inverter driving the motor in a low-speed mode. When the generator voltage is 137 V rms at a 395 V DC bus voltage $V_{dc1}$, the motor voltage is 57 V rms at a 281 V DC bus voltage $V_{dc2}$. The 142 A rms AC phase current enabled the generator to produce 54-kW power $p_G$ while the motor had a 141 A rms AC phase current generating 9 kW of power $p_M$ in a low-speed mode. This resulted in the battery charging at $p_B$=61.6 kW at a battery voltage $V_b$=200 V. The generator stator winding carried 89 A DC current to deliver the generating power to the battery and motor stator winding carried 14 A DC current to the battery. In this example, the generator phase frequency may be similar to elements 718, 720, 722, 724, 726, and 728 that would be at or greater than twice the frequency of the motor phase frequency that may be similar to elements 730, 732, 734, 736, 738, and 740.

Control logic or functions performed by controller may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but are provided for ease of illustration and description. The control logic may be implemented primarily in software executed by a microprocessor-based vehicle, engine, and/or powertrain controller, such as controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A powertrain for a vehicle comprising:
a Y-wound generator and a Y-wound motor, each having phase windings coupled between phase terminals and a neutral terminal, wherein the Y-wound generator and the Y-wound motor are electrically coupled via each respective neutral terminal;
a generator inverter coupled between the phase terminals of the Y-wound generator and generator bus terminals defining a generator bus;
a motor inverter coupled between the phase terminals of the Y-wound motor and motor bus terminals defining a motor bus;
a traction battery having a positive terminal coupled to the neutral terminals of the Y-wound generator and the Y-wound motor and a negative terminal coupled to one of the motor bus terminals and one of the generator bus terminals such that power flow to and from the traction battery is through the neutral terminals;
a controller configured to modulate switches of the generator inverter and the motor inverter such that voltage levels of the generator bus vary independently of the motor bus, wherein the switches are insulated crate bipolar junction transistors or metal oxide semiconductor field effect transistors; and
a generator controller configured to modulate switches of the generator inverter and a motor controller configured to modulate the switches of the motor inverter such that a generator phase frequency is independent of a motor phase frequency, wherein the motor phase frequency is at least twice the generator phase frequency and current flows from the positive terminal of the traction battery to the motor.

2. The powertrain of claim 1, wherein the one of the generator bus terminals and the one of the motor bus terminals are negative bus terminals of the generator bus and the motor bus.

3. The powertrain of claim 1 further comprising a generator bus capacitor and a motor bus capacitor, wherein a generator bus voltage level is filtered by the generator bus capacitor and a motor bus voltage level is filtered by the motor bus capacitor.

4. The powertrain of claim 1, wherein the generator phase frequency is at least twice the motor phase frequency.

* * * * *